Patented Mar. 28, 1944

2,345,431

UNITED STATES PATENT OFFICE 2,345,431

CORK COMPOSITION

Charles H. Schuh, Ridgewood, N. Y., assignor, by mesne assignments, to Carbide and Carbon Chemicals Corporation, New York, N. Y., a corporation of New York No Drawing. Application May 1, 1939, Serial No. 271,202

12 Claims. (Cl. 106—201)

This invention relates to composition material and particularly to compositions including substances conducive to fungus growth. The invention, moreover, relates to by-products of cork distillation and to processes of producing the same.

More specifically, the invention relates to a regranulated baked cork composition and to a stiff or rigid, light weight, insulating board comprising regranulated baked cork and cellulosic material, for instance, cellulosic fiber, and having fungus growth and/or fire retardant properties, and to a very light weight board of such characteristics.

The present invention is a continuation-in-part of my copending application Serial No. 179,867, filed December 15, 1937, which is a division of my copending application Serial No. 46,742, filed October 25, 1935, now patent No. 2,156,309.

The present light weight insulation board materials comprise, on the one hand, the well known baked corkboard insulation, and on the other, the cellulosic fiber board. These products have disadvantages and limitations which confine their use to certain fields. For example, present day baked corkboard consisting of 100% cork, is limited in its field of application, by high cost, low strength, and small practical size of board, which make its use prohibitive for prefabricated wall panels. It would be impractical to make a board of sufficient size, for instance, 4' x 10' x 2" of baked corkboard material. The fiber board has the disadvantage of higher weight or density, which means higher conductivity. For instance, the weight of a panel of fiber board of the size hereinabove mentioned, surfaced with a ⅟₁₆" high density cement-asbestos board on both surfaces, would be about 257 pounds. Such makes manual handling difficult and cumbersome. More particularly, fiber board is susceptible, among other things, to fungus growth, decay, attack by termites, high moisture absorption, and combustibility. It will be readily recognized that the problems of mold growth, termite attack, and excessive moisture penetration, on a core of fiber board material encased as above described, but with edges likely to be more or less exposed, may be serious. In addition, there is, of course, the high fire hazard resulting from the use of a combustible insulating core. In spite of extensive researches aimed at solving some of the problems brought about by the short-comings of the aforesaid conventional materials, no satisfactory solution, insofar as I am aware, has been forthcoming. At best, it has been suggested to chemically treat fiber board by the addition of arsenic compounds, chlorinated naphthalene, etc., to make the board resistant to mold growth and termite attack, but there are objections to such methods arising out of the toxic nature of the agents used, and the additional costs and processing incurred by their use.

The present invention aims to overcome the problems of high density and mold growth, and by a simultaneous treatment; and to provide material of higher fire resistant character. Moreover, the invention aims to overcome problems of mold growth in present day fiber board by a treatment that is wholly unobjectionable and not costly.

An object of the invention is to provide a low density composition comprising a cork substance obtained as a residue of a baking treatment which partially removes volatile organic material which is inherent in the cork or is formed during the baking treatment. This cork substance is included with materials designated herein by the phrases "regranulated baked cork" or, for brevity, "regranulated cork."

Another object of the invention is to provide a compressed composition of substantially uniform physical character comprising particles of regranulated cork and a fibrous material obtained by finely beating the fiber in an aqueous solution of at least 90% dilution to the form of individualized fibers of an average length less than about 0.08 inch, and to a non-settling volume density (dry weight) of less than about one pound per cubic foot; the said particles and fiber being in substantially uniform volumetric distribution and the said fiber lying in substantially all directions and presenting with the cork particles, a bonded composition substantially free of parallel matting of the fiber into planes of cleavage characteristic of cardboard, the fiber arrangement also being such that there results in the composition a substantially microcellular structure comprising a multiplicity of substantially uniformly distributed and substantially microscopic voids constituting at least 40% of the volume of the composition.

Another object of the invention is to provide a low density product comprising regranulated cork or the like material and organic material, the said product being resistant to fungus growth and to fire.

Another object of the invention is to provide a fungus growth inhibiting addition for compositions containing a fungus growth inducive substance.

A further object of the invention is to provide a light weight composition comprising regranulated cork and cellulosic material, for instance, cellulosic fiber.

Another object of the invention is to provide a fungus growth resisting treatment for organic material, comprising the addition to said material of a water-soluble aqueous distillate of cork.

A still further object is to provide a very light weight insulation product having valuable thermal and acoustical properties, and which comprises regranulated cork particles having a density less than about six pounds per cubic foot, more in the order of three pounds per cubic foot.

Another object of the invention comprises the heat distillation of natural cork to obtain valuable by-products, for instance, a composition adapted for fungus growth retardation and/or elimination, and/or adapted for use as solvents, plasticizers, lubricants, etc.

These and other objects of the invention will in part be understood and in part be more specifically pointed out in the following description when taken in conjunction with the claims.

I have discovered that the aforesaid limitations of baked corkboard may be substantially overcome by producing a board from a composition comprising a material which is now a waste product of the cork industry, that is, particles of regranulated cork or the like, and in particular, by a low density composition comprising such material and a medium of extension made in accordance with the procedure of my copending application Serial No. 46,742, now Patent No. 2,156,309, and with or without the use of any so-called binder substance or with the use of such a small percentage of the same as to make its presence entirely unobjectionable from the standpoint of increase in density, increase in thermal conductivity, and even increase in cost. The aforesaid waste product (finely ground regranulated cork) has a density of about six pounds per cubic foot, which is about one-half of that of natural cork wood in a similar form. The waste product cannot be used again in the manufacture of baked corkboard.

I may prepare, in accordance with the teachings of my Patent No. 2,156,309, an aqueous dispersion of finely divided regranulated cork, better less than about 10 mesh in size, and preferably between 50 to 200 mesh in size, and a medium of extension and filter aid, for instance, a finely pulped fibrous material such as finely pulped newspaper or wood pulp in the form of individualized fibers that will provide an abnormally large non-settling volume of precipitated substance, and subject such a slurry to filtration and a desired pressure to form a matrix of large volume, which, when dry, has the regranulated cork particles in substantially uniform volumetric distribution with the fibers lying in substantially all directions and presenting, with the regranulated cork particles, a continuous bonded composition substantially free of parallel matting of the fiber into planes of cleavage so as to produce a substantially uniform physical structure that is microcellular and possesses a multiplicity of substantially microscopic voids having substantially uniform volumetric distribution, and constituting at least about 40% of the volume of the composition. The uniformity of the structure will be readily recognized when a section of the matrix is cut longitudinally or either way transversely thereof. All will have a substantially similar appearance and will be substantially free of cleavage planes. The average individual fiber of the finely pulped fiber aforesaid should be less than approximately 0.08" in length and should be sufficiently beaten to give an abnormally large non-settling volume of fiber, having, for instance, a density less than about one pound per cubic foot, dry weight. In this condition, the fiber will be somewhat gelatinized. In the pulping operations, it is desirable to avoid the obtaining of large amounts of colloidal fiber, as such is detrimental to filtration. Other particulate substances, for instance, those described in my Patent No. 2,156,309, may be used in conjunction with the regranulated cork particles. Where such additive particles are of a character that would, in themselves, induce fungus growth, an additional advantage, as will hereinafter be pointed out, is obtained by the use of regranulated cork. Moreover, it will be understood that other fibrous substances, for instance, those disclosed in said copending application, may likewise be used in place of or in conjunction with the fibrous materials noted above. Preferably, however, the fibrous material will be, at least in part, of a cellulosic character to aid in filtration. It will be understood, of course, that the percentages of fiber and regranulated cork or additive materials to be used, will be determined in accordance with the formulae given in my copending application, with adequate correction for the inherent cellular structure of regranulated cork. Moreover, suitable binding agents such as, for example, a ½% latex or ½% aqueous resinous dispersion, may be utilized with variations in the amount, dependent upon the structure desired. Also, where it is desired to obtain the novel waterproofing properties set forth in my copending application, I may incorporate a small percentage of dispersed wax or any of the other waterproofing emulsions set forth in my copending application Serial No. 201,082, now Patent No. 2,232,977, whereby capillary action in the finished product will be entirely eliminated and the product will be rendered internally waterproof.

I have further discovered that the aforesaid limitations of fiber board material may likewise be greatly reduced by the addition of a material such as regranulated cork. By the addition of such material to the composition of fiber board, definite fungus growth resistant properties are obtainable without excessive cost and without introducing objectionable chemical agents. Moreover, this property is obtained while simultaneously decreasing the density of the fiber board product, decreasing its coefficient of thermal conductivity, markedly improving its resistance to fire hazard, and decreasing its vulnerability to moisture absorption. I have found that the use of 30% or more of this material is desirable to obtain best results. However, it will be understood that substantial benefits may be obtained by the utilization of lesser amounts of such material, but in that case the properties of the fiber board product will not be as effective from the standpoint of fungus growth.

In speaking of regranulated cork, I desire to emphasize that this material, obtained by baking natural cork, is entirely different both chemically and physically from natural cork; it is dark or black in color, lighter in weight than natural cork, and possesses expanded cells having certain constituents of the cell wall material removed by volatilization and others decomposed by the heat of the baking operation. This chemical difference is markedly illustrated by the fact that natural cork, when added, for instance, to cellulosic fiber, does not provide fungus growth resistance, but that the regranulated cork material, if properly handled, does provide this property.

It has been found that the regranulated cork material now obtainable as a by-product of the cork industry, varies somewhat in character. The weight, color, and chemical characteristics vary due to the methods of handling and variations in the baking of the corkboard from which it is obtained as a trimming. These differences cause variations in the results when regranulated cork is used in the making of a cellulosic fiber insulating board. I preferably use at least 30% of regranulated cork to obtain definite fungus growth resistant properties in all cases. In using the regranulated cork, it is preferred that the regranulated cork be added to the cold pulp suspension after pulping of the fibers has been completed, and with only sufficient subsequent pulping or mixing to obtain a uniform suspension. This procedure is desirable where the fiber is being pulped in a beater with hot water, for it is found that if the regranulated cork be added to the beater prior to pulping the fiber, the fungus growth resistance of the resulting product will be adversely affected, and in extreme cases, where exceedingly large quantities of water are used, may be almost completely neutralized. This is believed to be due to the extraction of the effective ingredient by the hot water. Preferably, the regranulated cork should be finely ground in order to obtain good distribution of the material and intimate contact of the cork with all the fiber. It is also found desirable to avoid comparatively strong alkaline agents, such as ammonia, and also organic agents such as latex, which adversely affect the fungus growth resistance of the resultant product.

Inasmuch as the available regranluated cork is now a waste product of the cork industry, it is definitely a limiting factor, so far as commercial production of the products of the present invention are concerned. A new source of regranulated cork or the like is therefore necessary for large operations. I have discovered that a product more uniform and more effective than the present waste regranulated cork product, may be obtained by suitable treatment of natural cork materials, and in addition, that valuable by-products may also be obtained. Moreover, I have been able to isolate the substance which is principally responsible for the fungus growth resisting properties and by my novel process of treating the natural cork, I may obtain substantial quantities of this substance for use as a treatment unto itself. Moreover, by a modified process I may obtain resultant cork material that has a density as much as 50% less than that of the present waste regranulated cork waste material of the corkboard industry. Thus, it is a feature of my invention to subject natural cork material, for instance, shavings or granules from the cork stopper industry, to a proper type of heat treatment to obtain the foregoing results. The exact nature of the heat treatment will depend upon the dominant characteristic desired in the finished product. When fungus growth resistance is the chief consideration, and it is additionally desired to obtain distillation by-products as well, the natural cork usually in the form of broken pieces, but preferably in the form of granules, is subjected to a long, thorough baking distillation of high temperature, for instance, 400° F. to 600° F. On the other hand, if light weight is the chief consideration and distillation by-products are not desired, the natural cork is heated to about 400° F. or more under conditions allowing a maximum expansion of the cork cells in the shortest possible time and with only a small amount of decomposition and loss of volatile matter.

In the first instance, I have discovered that as much as 45% of volatile by-products may be distilled off and still have a residue suitable for making the product of the present invention, that is, the regranulated cork will be of extremely low density, less than six pounds per cubic foot; and as low as three pounds per cubic foot, dependent upon the quantity of by-product distilled. Moreover, where the distillate does not exceed the above amounts, the regranulated cork residue will retain sufficient fungus growth resistant substance to make it completely effective in combating fungus growth of the finished product of which it is a part. Of this 45% of by-products, about 15% consists of oils and about 30% consists of an aqueous distillate. The latter may be fractionated in the conventional manner and about 5% thereof separated, having a boiling point range of about 45° C. to about 96° C. and a specific gravity of about 0.876 to about 0.920. This portion is believed to contain cyclic alcohols and derivatives which make excellent solvents. The remaining aqueous portion has an acid reaction, a yellow discoloration increasing by absorption of oxygen from the air, and a slightly acetic odor, also increasing with oxidation. The water soluble constituents contained herein are believed to include di-hydroxy and tri-hydroxy phenols and derivatives and decomposition products thereof. I have found that this aqueous portion of distillate formed during the distillation by a decomposition that progresses inwardly from the surface of each particle of the cork material during heat treatment, and some of which decomposition material is retained in the baked material after the distillation or baking is completed, definitely contributes toward the fungus growth resistant properties of the regranulated cork. This being the case, the aqueous portion of the distillate that is driven off in treatment may, therefore, be added to the pulp suspension in making the products of the present invention with increased benefits in fungus growth resistance. Moreover, the aqueous portion of the distillate may be used alone as a treatment for various materials, particularly organic substances that are conducive to fungus growth to provide these materials with resistance to such action. It will, of course, be understood that the amount of distillate to be used will depend upon the conditions of each application. Where this distillate is utilized, together with the novel waterproofing emulsions heretofore mentioned, it is desirable that the aqueous portion of the pulp suspension have a pH value not lower than 6.0 in order not to adversely affect the flocculating characteristics of the particles of said emulsions.

The oil layer or distillate obtained as above, may be distilled into various fractions having boiling points ranging from 50° C. to 375° C. and specific gravities from 0.763 to 0.940. I have found that a solid residue remains above 375° C. These oils are all insoluble in water and only very slightly soluble in alcohol. They have a pale yellow color and slight greenish tint, and all absorb oxygen from the air, becoming dark colored and finally, almost black on standing. They also have a disagreeable odor. The discoloration on standing, the odor, etc., are obviously undesirable when considering the use of these oils for certain purposes for which they might otherwise have some appreciable value.

I have, however, discovered that by boiling this distillate with a strong caustic solution and separating a portion of the oil, which is soluble therein, and then redistilling several times, that very clear, almost water white fractions are obtainable that do not discolor on standing. I have not been able to determine as yet the chemical nature of these oils, but they will be readily recognizable from the properties hereinabove given. Moreover, having now removed the objections to this distillate, a number of uses now suggest themselves. For instance, these water white fractions may be used as solvents, plasticizers, lubricants, etc.

From the description of this distilling procedure of natural cork, it will be observed that the high yields of by-products of value obtainable in the operation of producing the regranulated cork from natural cork waste is not only exceedingly important from the standpoint of uniformity of resultant products, but is likewise a procedure likely to be extremely profitable commercially and to make the cost of the cork residue extremely low. It is desired to emphasize, at this point, that the chemical nature and amounts of by-products obtained by the aforesaid baking and distillation procedure are not to be confused with the destructive distillations of the various kinds of woods or bark wherein methyl alcohol, acetic acid, acetone and creosote, and in some cases, turpentine and rosin, are the chief products, for the chemical nature and amounts of by-products obtained by the described procedure and the use of cork therein, are entirely different from the results obtained in any of these known destructive distillations.

A further feature and one that contrasts with the above method of handling the natural cork waste for maximum yield of by-products with a satisfactory regranulated residue, resides in the second method mentioned above involving the rapid expansion of the cork cells to the limit, with only a minor amount of decomposition and volatilization. In accordance with this procedure, natural cork granules that are not too large in size (about ¼") are brought under proper conditions, for instance, in a rotary kiln, into quick and intimate contact with a heating agent, such as superheated steam of about 400° F. to 500° F. By this procedure, the cork cells of the granules may be expanded several hundred percent with relatively little decomposition. The cork granules, after being expanded, are cooled without there being any pressure thereon, so that the maximum volume is obtained. Subsequently the regranulated cork thus obtained is finely ground in the same manner as the residue obtained by the above distillation method. The regranulated cork obtained in this manner will have sufficient internal decomposition to provide effectiveness in resisting fungus growth, i. e., the surface portion of the natural cork material, which normally prevents its use as a fungus growth resistant product, is decomposed in the process to make it effective. Moreover, a maximum lightness of cork product is obtained in this manner. Thus, whereas the regranulated cork now available as a waste product of the cork industry and referred to above, has a density of about six pounds per cubic foot, the regranulated cork of similar size made by the present procedure of expanding the cork to the limit, as herein described, may have a density even as low as three pounds per cubic foot; in other words, about one-half the density of the presently available material. It will, therefore, be recognized that regranulated cork made in accordance with my invention can be made to go twice as far by volume and produce a product that is about 30% lower in weight when about 60% of regranulated cork is used in the composition, as against using present regranulated cork.

I have further discovered that the fire resistance of composition products made with the regranulated cork material is definitely improved; for instance, regranulated cork will greatly enhance the fire resistance of cellulosic fiber insulating board when added to the composition of such a product. The amount of this improvement will depend upon the size, amount, and character of the fiber, which determines, to some extent, the size and character of the voids in the finished product. Small, finely divided fiber and evenly distributed voids substantially improve fire resistance. Moreover, I have found that the addition of bentonite, together with the regranulated cork addition, produces results, for instance, in the composition of cellulosic insulating fiber board that is out of all proportion to expectations so far as improving fire resistance goes. Moreover, bentonite may be added to such composition to secure these remarkable results without adversely affecting the moisture absorption of the finished product. This is also true when added water-repellent substances, for instance, those of my copending application Serial No. 201,082, now Patent No. 2,232,977, are present, but in such instances the pH value of the suspension is preferably near 7 for optimum moisture resistance. The bentonite also increases the strength of the finished product. Accordingly, it is a further feature of the invention to make products of a composition, preferably one prepared in accordance with the steps of my copending application, which composition contains finely divided cellulosic fiber, regranulated cork, and bentonite. The composition may also include some finely divided asbestos fiber and a small amount of alum may be added to improve filtration and make the composition neutral. Moreover, a small amount of dispersed paraffin of the character described in my copending application Serial No. 201,082, now Patent No. 2,232,977, may be added to obtain further waterproofing qualities. A product made from a large volume suspension of such a composition in accordance with the teachings of my copending application Serial No. 46,742, now Patent No. 2,156,309, to obtain low density products, will have definite fungus growth resistance, fire resistance, moisture resistance, strength, low density, low conductivity, high acoustical insulation value, and may be made at low cost. It will be recognized that such a combination of properties make an ideal insulating board or composition which the art, insofar as I am aware, has never before been able to achieve in practice.

In connection with the use of the regranulated cork made by the expansion process herein described, I desire to point out that the general formula set forth in my copending application Serial No. 46,742, now Patent No. 2,156,309, to determine the amount of medium of extension (finely divided fiber) to be used in making low density, compressed products using a finely pulped fibrous material of large non-settling volume with a certain amount of fine particulate material had to be adjusted in the case of regranulated cork due to its microcellular structure, the variation being generally indicated in an example there given. This deviation from the empirical formula is still further exaggerated in considering regranulated cork made by expanding natural cork to the limit, as described herein. To produce products of similar structure to that described in said copending application, I have found it desirable to use about 43% of the new, regranulated cork of about three pounds density instead of using about 65% of the present regranulated cork waste of the cork industry of six pounds density. In other words, the percentage of fiber is still further increased. These amounts give approximately the same volumetric composition which determines the structure.

For the purpose of giving those skilled in the art a better understanding of the invention, the following illustrative examples are given.

*Example No. 1*

To about 1000 pounds of a ½% latex dispersion, about 20 pounds of newspaper are added and subjected to high speed mechanical disintegration until the average individual fiber is about or less than approximately 0.08 inch in length. To this medium of extension, about 40 pounds of finely ground regranulated cork (trimmings of baked cork board) are added with high speed mixing. The mixture is run into molds which in their simplest form are rectangular boxes, the bottoms of which are filter screens of approximately 16 mesh. It is essential to fill the form quickly and agitate the mixture while still very dilute so as to obtain a uniform suspension in the mold and, once the matrix is formed, it must not be disturbed by further mixing. This latter point is important because in filling a form with a dilute aqueous mixture, as used herein, to the depth required, a considerable washing effect is encountered, tending to disturb and wash out the matrix which is formed immediately adjacent to the filter screen during the filling process. If such local washing out is allowed to occur during filling, the slabs will have holes and regions of decreased thickness when finished, even though the molds are apparently absolutely evenly filled at the end of the filling operation. By noting the above precaution, an even and uniform slab can be made.

After the major portion of the liquid has filtered off, a cover made of 16 mesh screen and fitting accurately inside the mold, is placed on the material and a slight pressure is applied. It has been found that a pressure as little as about 2 to about 4 pounds per square inch is sufficient to produce the result required in this present case. The pressed slabs will still contain 400% to 600% aqueous liquid calculated on the dry weight of the material used. The slabs are then removed from the forms by inverting them onto another screen and are placed in a dryer. The filtrate is, of course, recovered and used for subsequent batches. The dried material will have a density of approximately 7 to 9 pounds per cubic foot, which is lower than corkboard itself and a thermal conductivity of approximately 0.24. Those skilled in the art will readily understand how unit operations of the above type may be conducted on a continuous scale.

In the above illustration, it is advisable to have the cork as finely powdered as practicable, certainly less than about ten mesh and preferably about 50 to about 200 mesh. This is contrary to prior methods of corkboard manufacture wherein large granules are used. The use of an extension medium as herein described in the manufacture of a corkboard is a novel feature of the process. The establishment of a critical range of composition, namely, about 20 to about 50% medium of extension, with the optimum value established at about 25%, is an important factor of control. The formation of a greatly extended matrix under filtration and its gradual compression without interrupting its continuous physical structure, is another important principle of the invention.

*Example No. 2*

The same general procedure as described in connection with Example No. 1 is followed. The materials used are about 1000 pounds of 15% latex dispersion, about 60 pounds of a medium of extension (dry weight), and about 60 pounds of finely powdered exterior bark portion of corkboard. The boards are made still thinner, about ⅛ of an inch for, say, sole leather substitute or flooring material, and a still higher compression is used, sufficient to reduce the aqueous content to about 100 to 150%. A strong, flexible, physically uniform structured material having a fine texture, free from visible voids, or cork granules, or visible fiber, is obtained. For certain purposes, hardening agents, such as sodium silicate, various resins, etc., may be added. Of course, in using latex, it may be compounded according to well known principles with the use of anti-oxidants, accelerators, etc.

I have found that the addition of a small percentage of dispersed wax to the medium of extension will entirely eliminate any capillary action in the finished product and will render it internally waterproof. For many products, this is extremely important. I have found that this wax may be satisfactorily incorporated by slowly pouring the melted wax into the hot medium of extension under high speed agitation.

*Example No. 3*

100 pounds of cork waste as obtained from the cork stopper industry are ground to about ¼ mesh and less and placed in an iron retort and heated by direct fire so that the inside temperature will be about 400° F. to 600° F. The heating is continued until about 45 pounds of distillate are collected. The retort is then cooled and the mass of baked cork is finely ground. The distillate is allowed to settle and the water layer (about 30 pounds) drawn off from the bottom. This is then subjected to fractional distillation by means of which 1½ pounds of almost colorless distillate boiling between 45° C. and 96° C. are separated. This will be referred to as distillate AA. The remainder of the aqueous portion, about 28½ pounds is put aside for use in the insulating board and this will be referred to as distillate AB. To the oil layer, of about 15 pounds, about 40 pounds of 20% caustic soda solution is added and distilled until about 20 pounds of distillate are collected which will contain an oil layer of about three pounds. This oil layer is distilled several times and a clear, almost water-white distillate is obtained which will be called distillate OA (boiling point range 68° C. to 220° C., density range 0.776 to 0.860). The two layers remaining in the flask are separated by drawing off the aqueous caustic layer from the oil layer. The latter is distilled several times and about 7 pounds of a clear oil varying in color from almost water-white to a pale greenish yellow are obtained. This distillate, which will be referred to as distillate OB, has a boiling point range from 245° C. to 345° C. and a density range from 0.860 to 0.866. The aqueous caustic layer is neutralized with HCl and the oil layer that is precipitated is separated and distilled several times whereby about 5 pounds of a pale reddish golden oil is obtained having a boiling point range of 210° C. to 235° C. and a density range of 1.022 to 1.015—called distillate OC.

From the above operations there are obtained four refined distillates AA, OA, OB, and OC which do not readily discolor on standing, and which may be found useful for the several purposes suggested above and would be sold as by-products in carrying out the invention commercially. The distillate AB and the ground regranulated cork are used as follows.

To about 3,000 pounds of water, 63 pounds of newspaper stock are added in a beater and the fiber suspension is pulped while steam is added to heat the water. When the fiber has been sufficiently pulped to obtain a large non-settling volume of the order of about one pound per cubic foot as described in my co-pending applications aforesaid, the pulp suspension is run into a storage vat and allowed to cool. In practice other batches are made while the cooling takes place. While mixing by means of a high speed mixer installed in the vat, about 20 pounds of a 50% paraffin emulsion such as described in my co-pending application Ser. No. 271,201 is added. After this addition the 55 pounds of regranulated cork prepared above and the distillate marked AB are added and mixed only long enough to obtain an intimate uniform dispersion whereupon the mixture is immediately run into molds, dewatered, and dried as described in the above pending application. In commercial practice the filtrate is recovered and used over again so that any extracted water-soluble matter is retained in the system. The dried board thus produced will be found to have a density of only about 5 to 7 pounds per cubic foot.

If a piece of this material is placed in a jar with some water to supply moisture and is inoculated with the common green or black mold and the jar is covered and kept at a temperature of about 80° F., there will be no mold growth after two weeks time. In fact the seed mold gradually dies off.

The thermal conductivity of this board will be found to be only about 0.27 B. t. u. etc. at a mean temperature of about 60° F. The moisture absorption will be only about 5% after a 72 hour immersion. The board has no capillarity. The fire resistance will be such as to make the board very slow burning under the standard test.

*Example No. 4*

125 pounds of natural cork waste as used in Example No. 3 are ground to ¼ mesh and less and fed into a horizontal, rotating cylinder and super-heated steam at a temperature of about 475° F. is passed therethrough while rotating the cylinder. After about 20 minutes the expanded cork is allowed to discharge into a closed cooling vessel in which there is a non-oxidizing atmosphere such as $CO_2$. When cooled, the expanded cork is finely ground. About 100 pounds are obtained.

About 68 pounds of newspaper stock and 32 pounds of asbestos are pulped in about 3,000 pounds of water as in the above example. To the cooled suspension about one pound of 50% paraffin emulsion of the same kind as used above is added with high speed mixing. Eighty pounds of bentonite are then added and this is followed by about 19½ pounds of alum which is sufficient to give a neutral color reaction with brom-thymol-blue. After this, the 100 pounds of regranulated cork prepared above are added and the mixing continued only long enough to get an intimate and uniform dispersion after which the suspension is immediately dewatered in molds and dried in the same manner as in Example No. 1.

The finished board will have a density of only about 9 pounds per cubic foot. It will be found mold growth resistant when tested as above. The conductivity will be only about 0.31 B. t. u., etc., at a mean temperature of 60° F. and the moisture absorption will be only about 14% after a 72 hour immersion. The rupture modulus will be over 100 pounds per square inch.

Even though the board contains over 50% combustible matter, it will be found extremely fire resistant. When placed over the hottest part of a Bunsen burner for half an hour, a one inch thick board will show hardly more than a white discoloration where the flame strikes it. Hardly any smoke is given off at all, and no discoloration due to any combustion can be seen on the top of the board. The board does not burn away where the flame strikes it even though it gets red hot. There is no sparking. Such a board has sufficient fire resistance to be put to any building construction purpose.

*Example No. 5*

In the commercial production of fiberboard, cane or wood fiber is digested and pulped to produce a pulp suspension. About 10% to 20% of news stock which has been disintegrated in an engine beater is added. To this cooled pulp suspension, about ¼% of paraffin emulsion of the type used above is added. Then about 30% to 60% of commercial regranulated cork such as is now obtained from the cork industry, is added, and as soon as an intimate mixture is obtained it is fed into an Oliver board forming machine where it is dewatered and formed into a continuous board which passes through a continuous dryer. The filtrate from the Oliver is returned to the beater and used over again, forming a closed system so that any water soluble extracted matter stays in the system and is not lost. A dried, finished board of improved characteristics is obtained. The board has satisfactory fungus growth resisting properties. The density will be reduced between three to five pounds per cubic foot. Moreover, the moisture absorption and capillarity are substantially reduced and the fire resistance is substantially improved as well.

*Example No. 6*

To about 3,000 pounds of water, 20 pounds of news stock and 80 pounds of cane fiber stock, are added and pulped in a beater to a uniform suspension. About one pound of paraffin emulsion, such as used above, is added and finally about 450 pounds of aqueous distillate of the kind referred to in Example No. 3 as distillate AB. The pulp suspension is then dewatered and formed into a board having a moisture content of 67% (200% based on the dry weight of the board). The board is then finally dried. This board will be found to be resistant to mold growth. In commercial practice, the filtrate is, of course, recovered and used over again in subsequent batches.

From the foregoing description of certain exemplified embodiments of my invention, it will be readily discernible that I have provided, among other features, entirely new cork compositions and cork material, new fungus growth retardation and elimination additions for susceptible compositions, new fire retardant substances, and methods of treating natural cork materials to obtain new cork products and valuable by-products. It will be understood that the principles and features of my invention are not limited to the preferred structures, nor to the conventional long fiber board compositions, but may be applied to all types of compositions regardless of structure, where one or more of the benefits of fungus growth resistance, light weight, low thermal conductivity, improved moisture and fire resistance, and low cost are desirable factors. It will also be apparent that many changes in procedure and composition may be made and others will readily suggest themselves to those skilled in the art, all, however, without departing from the spirit and scope of my invention, which is to be construed as broadly as the following claims taken in conjunction with the prior art may allow. Moreover, by the present invention, there is no waste cork material since all portions may be used. The terms "regranulated cork" and "regranulated baked cork" unless otherwise qualified herein are intended to be generic to the cork substances disclosed herein and to embrace not only the waste product regranulated cork of the cork board industry, but also the baked natural cork waste and the rapidly expanded cork waste of the present invention, all of which cork substances are obtained as a result of a heat treatment which forms or liberates fungus-resisting products in the cork but does not remove such products beyond such limit as leaves the cork substance resistant to fungus growth. Moreover, the term "uniform volumetric distribution" as used in the specification and claims, is intended to mean uniform distribution in three dimensions.

I claim:

1. A light weight compressed composition adapted for insulation comprising ½% to 5% of rubber in the form of latex, finely ground "regranulated baked cork" particles having the property of resisting fungus growth and of a size to pass a 10 mesh screen in an amount between 20% to 50% of the total dry weight of the composition, exclusive of the binder, and the remainder comprising finely pulped cellulosic fibrous material in the form of individual fibers of an average length less than about 0.08 inch; said particles and fibers being in substantially uniform volumetric distribution, with said fibers arranged in substantially all directions, and said particles and fibers and binder presenting a continuous bonded structure that is microcellular, and comprises a multiplicity of substantially uniformly distributed substantially microscopic voids, said composition having a density in the order of about 7 to 9 pounds per cubic foot dry weight and a thermal conductivity in the order of approximately 0.24 B. t. u./hr./sq. ft./inch thickness.

2. A light weight cellulosic fiber insulating material comprising cellulosic fiber and 30% to 60% of "regranulated baked cork," said baked cork having the property of resisting fungus growth.

3. A light weight insulation material having fire resistant and fungus growth retardant properties, comprising organic fiber, "regranulated cork" having the property of resisting fungus growth, asbestos fiber, and bentonite.

4. A light weight cellulosic fiber insulating board having fungus growth resistant properties and having low moisture absorption comprising cellulosic fiber, "regranulated baked cork" having the property of resisting fungus growth, and dispersed paraffin, said board having a density less than about twelve pounds per cubic foot and having a moisture absorption of less than 10% by volume in 72 hours water immersion.

5. A fungus growth resistant composition adapted for insulation comprising organic material normally having fungus growth supporting tendencies and an inhibiting agent in sufficient amount to overcome such tendencies, said inhibiting agent comprising a fungus growth inhibiting "regranulated baked cork."

6. A fungus growth resistant composition adapted for insulation comprising an organic material normally having fungus growth supporting tendencies and an inhibiting agent in sufficient amount to overcome such tendencies, said inhibiting agent comprising a fungus growth inhibiting regranulated baked cork and the aqueous distillate of natural cork boiling above 96° C.

7. A fungus growth resistant composition adapted for insulation comprising an organic material normally having fungus growth supporting tendencies and an inhibiting agent to overcome such tendencies and in amount greater than 30% by weight of the composition, said inhibiting agent comprising "regranulated baked cork" having the property of resisting fungus growth of less than 6 pounds per cubic foot density and having less than 45% decomposition.

8. A light weight bonded composition adapted for insulation comprising at least 30% finely divided "regranulated baked cork" having the property of resisting fungus growth bonded together with finely divided fibrous material and a binder.

9. A fungus-resisting composition comprising fiber and "regranulated baked cork."

10. A fungus-resisting composition comprising cellulosic fiber and "regranulated baked cork" having a density under 5 pounds per cubic foot.

11. A light weight compressed self-sustaining, uniformly microcellular fungus-resisting thermal insulating composition comprising principally particles of finely divided "regranulated baked cork" having the property of resisting fungus growth, and finely pulped fibrous material comprising short fibers not exceeding 0.08 inch in length, said fibers constituting from 20% to 50% by weight of the composition; said composition being particularly characterized by random orientation of said fibers, such short length and random orientation of said fibers imparting to said composition a uniform structure substantially free from the layers of cleavage and parallel matting of fiber characteristic of cardboard.

12. A compressed composition as claimed in claim 11, including ½% to 6% of dispersed waterproofing agent.

CHARLES H. SCHUH.